United States Patent Office 2,825,711
Patented Mar. 4, 1958

2,825,711

PLASTISOL COMPOSITIONS, PROCESS OF PREPARING SAME, WATER VAPOR PERMEABLE COATED FABRICS PREPARED THEREFROM AND PROCESSES THEREFOR

Raymond J. Mayfield, Newburgh, N. Y., assignor to E. I. du Pont de Nemours and Company, Wilmington, Del., a corporation of Delaware No Drawing. Application June 28, 1954
Serial No. 439,900

16 Claims. (Cl. 260—31.8)

This invention relates to plastisol compositions comprising a blend of water-insoluble non-electrolyte and a cross-linked anionic polyelectrolyte polymer and process of preparing shaped articles therefrom. More particularly the invention relates to a process of preparing water vapor permeable films and coatings.

In a copending application, S. N. 364,487, filed June 26, 1953, by H. L. Jackson, now U. S. Patent 2,794,010, there is disclosed a process of preparing water vapor permeable films and coatings which comprises the steps of forming a composition by dissolving a water-soluble anionic polyelectrolyte polymer containing epoxy groups, capable of cross-linking on heating, in an aqueous dispersion of a water-insoluble non-electrolyte film-forming polymer, casting a film of the aqueous composition and drying the cast film to remove the water. The present invention provides an alternative and improved process for forming the water vapor permeable films and coatings described in the aforementioned copending application.

The terms "cross-linked polymer" and "polyelectrolyte polymer" are used throughout the specification and appended claims in their usual and accepted meaning in polymer chemistry, as defined in the Jackson U. S. Patent 2,794,010.

The term "plastisol" is used throughout the specification and appended claims to denote a mobile dispersion of ungelatinized particles of a blend of polyelectrolyte polymer and non-electrolyte polymer in a liquid plasticizer, the plasticizer being a substantially non-solvent for the non-electrolyte polymer at room temperature and a solvent at elevated temperatures.

In the formation of relatively thick and smooth films and coatings from the aqueous dispersions described in the aforementioned Jackson application, it is necessary to apply the compositions to a substrate, either temporary or permanent, in a plurality of coats with a drying operation between each successive coat. Films prepared from the aqueous dispersion are not uniform in water vapor permeability. This variation in water vapor permeability is believed to be due to the agglomeration of the polymer particles, i. e., both polyelectrolyte and non-electrolyte polymers, when suspended in a common aqueous medium, tend to agglomerate and give a non-uniform film.

It is an object of this invention to provide a process of preparing continuous films from a blend of water-insoluble non-electrolyte film-forming polymer and a water-soluble polyelectrolyte polymer which are uniform throughout with respect to water vapor permeability. Another object of this invention is to provide a process for forming smooth, relatively thick films and coatings in one coat from a dispersion of the polymer blend in an organic medium which are uniform in water vapor permeability. A further object is to form plastisol or organosol dispersions of the polymer blend from which water vapor permeable films and coatings may be prepared.

These and other important objects of this invention are accomplished by preparing a dry blend of particulate water-insoluble non-electrolyte film-forming polymer and particulate anionic polyelectrolyte polymer before dispersing the particles in a liquid organic plasticizer medium at room temperature to form a mobile plastisol composition. The weight ratio of non-electrolyte polymer to polyelectrolyte polymer is in the range of 50:50 to 97:3; i. e., the weight of the polyelectrolyte may vary between 3 to 50 parts per 100 parts of the blend. The anionic polyelectrolyte polymer contains at least 0.2 acidic (anionic) group per 100 molecular weight and also contains oxirane, i. e., 1,2-epoxy groups, the molar ratio of acidic groups to oxirane being at least 1:1. The weight ratio of polymer blend to plasticizer is in the range 30:70 to 70:30.

The polyelectrolyte polymers of this invention contain oxirane or 1,2-epoxy groups, i. e., groups of the formula

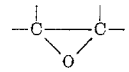

The term "epoxy" will be used throughout the specification and claims to designate the 1,2-epoxy or oxirane group. Because of the presence of these groups, which are known to open readily, e. g., under the influence of heat, these polymers are readily capable of covalently cross-linking, and thus giving polymeric films and coatings resistant to water and organic solvents. They also contain anionic, or acidic groups; these terms referring, of course, to groups ionizable in aqueous solution with the formation of hydrogen ions, typical representatives of which are the carboxyl (—COOH), sulfonic (—SO$_3$H), and phosphoric (—PO$_4$H$_2$) groups. It is to be understood that these terms include the alkali metal or ammonium salts of the acid radicals.

The polymers employed in the preparation of the blends of this invention are, for one component, linear polyanionic polymers containing epoxy groups, and for the other component, water-insoluble linear polymeric non-electrolyte. With respect to the former, many linear polymers containing a plurality of anionic (acidic) groups, e. g., carboxyl, sulfonic or phosphoric groups, have been described. Epoxy groups can be introduced in these polymers in any suitable manner, for example, by copolymerizing unsaturated acidic monomers with polymerizable epoxy-containing monomers, or by reacting a portion of the acidic groups of the preformed polyelectrolyte polymer with a reagent which introduces epoxy groups. For the purposes of this invention, the polyanionic polymer is often, and in fact preferably, used as its ammonia or alkali metal (e. g. sodium or potassium) salt, since the films of such salts are more permeable to water vapor than the free acids.

It is highly important that the polyanionic polymer contain at least 0.2 acidic groups (e. g. carboxyl, sulfonic or phosphoric) per 100 molecular weight since it has been found that at least this amount is necessary; first, to make the polymer water-soluble and, second, to make the resultant cross-linked product more permeable to water vapor. Preferably, the polyanionic polymer contains ebtween 0.25 and 1.0 acid groups per 100 molecular weight. It is also highly important that the molar ratio of acid to epoxy groups in the polymer be at least 1:1, and preferably between 2:1 and 10:1, in order to assure cross-linking of the epoxy group. The polyelectrolyte polymers may contain very small amounts of epoxy groups, as low as 0.005 epoxy group per 100 molecular weight, but preferably they contain between 0.02 and 0.5 epoxy groups per 100 molecular weight. The molecular weight of the epoxy containing polyanionic polymer should be in excess of 1,000 and preferably in the range of 1,500 to 100,000, although it can be as high as 500,000 or even higher. The polymer should be soluble in water, at least to the extent of 1% and preferably to the extent of at least 2%.

The other component of the polymeric blends of this invention is a water-insoluble non-ionic polymer. For best results, the non-electrolyte polymer should have a molecular weight of at least 1,000, and preferably in the range of 1,500 to 500,000, although polymers of even much higher molecular weight may be used. Particles of the non-electrolyte polymer must be dispersible in a liquid plasticizer for the polymer, which is a non-solvent for the polymer at room temperature and a solvent for the polymer at elevated temperatures. The liquid plasticizer dispersing medium may contain a minority proportion of a volatile organic liquid which is not a solvent for the polymer and is compatible with the plasticizer.

The following detailed examples will illustrate the invention in which the parts and percentage figures are expressed on a weight basis, unless otherwise designated.

Example I

A water vapor permeable coated fabric was prepared by coating a base fabric with a polyvinyl chloride/polyelectrolyte plastisol composition. The plastisol was prepared in accordance with the procedure outlined below.

An aqueous suspension of polyvinyl chloride was prepared separately in accordance with the following formula:

| | Parts by wt. |
|---|---|
| Polyvinyl chloride powder | 50.0 |
| Trisodium phosphate | 1.5 |
| Octyl phenyl polyglycol ether | 1.0 |
| Water | 47.5 |
| | 100.0 |

The vinyl resin was added slowly to the other ingredients while mixing thoroughly on a high-speed mixer.

A commercially available water-soluble polyelectrolyte sodium salt of polyacrylic acid ("Good-rite" K–710) was cross-linked with epichlorohydrin in the following proportions:

| | Parts by wt. |
|---|---|
| 15% solution of sodium salt of polyacrylic acid in water | 100 |
| Epichlorohydrin | 3 |

The epichlorohydrin was stirred in the aqueous solution with high speed mixing, after which it was allowed to stand for a period of three hours and a light gel was formed. The polyelectrolyte gel was then diluted to 7½% solids with water which stops or slows down the cross-linking.

The aqueous suspension of polyvinyl chloride and polyelectrolyte gel was blended in the following proportions:

| | Parts By Wt. | |
|---|---|---|
| | Wet Basis | Dry Basis |
| 50% Suspension of Polyvinyl Chloride in Water | 37.5 | 80.0 |
| 7.5% Aqueous Gel of Sodium Polyacrylate Cross-linked with Epichlorohydrin | 62.5 | 20.0 |
| | 100.0 | 100.0 |

The polyelectrolyte gel was added slowly to the aqueous polyvinyl chloride suspension while being subjected to high speed mixing. The stirring was continued until thoroughly mixed. The mixture was dried by spray drying. Other methods of drying can also be used effectively such as drum and tray drying. The dry vinyl chloride polymer particles coated with the cross-linked polyelectrolyte represents an article of commerce which may be packaged and shipped to converters for the manufacture of water vapor permeable films and coatings.

Since the particle size of the dried powder is large for plastisol formulating, a ball mill may be used for pulverizing or comminuting the dried resin.

After the powders have been comminuted, they are ready for plastisol formulating with the exception of one precaution. The powders, being moisture sensitive, pick up water which can give difficulty in subsequent operations. This possibility is eliminated by drying the resin for several hours in an oven at 160° F. just before formulating.

A typical paste (plastisol) formulation is as follows:

| | Parts by wt. |
|---|---|
| Particulate polyvinyl chloride/sodium polyacrylate cross-linked with epichlorohydrin (80/20) | 51.1 |
| Di(2-ethyl hexyl) phthalate | 40.9 |
| Pigments | 5.0 |
| Stabilizer | 1.0 |
| Hydrocarbon diluent (kerosene) (B. R. 175–275° C.) | 2.0 |
| | 100.0 |

The plastisol was prepared in the conventional manner of mixing the above ingredients together at room temperature and passing the mixture through a three-roll mill to insure smoothness. The above formulation which had a resin-plasticizer ratio of 50/50 possessed a viscosity suitable for spreading on a fabric substrate (Brookfield reading of 15,000 centipoises with #4 spindle and 100 R. P. M.). However, at lower levels of plasticizer, more diluent is required. When the hydrocarbon diluent is increased appreciably organosols are formed.

The plastisol composition described above represents an article of commerce which may be packaged and sold to converters for further processing into shaped articles.

The above plastisol composition was spread by means of a doctor knife on a broken twill weave cotton fabric running 1.14 yards per pound per 54″ width. Approximately 9 ounces of plastisol were spread on one square yard of the fabric base in a single coat and it was passed through a heat zone having a temperature of about 300–350° F., to evaporate the hydrocarbon diluent and coalesce the plastisol to a tough, continuous and water vapor permeable film.

It is sometimes desirable to have a topcoat on the highly plasticized permeable structures to give them a dry feel and prevent plasticizer migration. A typical topcoat formulation is as follows:

| | Parts by wt. |
|---|---|
| Particulate polyvinyl chloride/sodium polyacrylate cross-linked with epichlorohydrin (80/20) | 11.3 |
| Polymethyl methacrylate | 3.2 |
| Methyl ethyl ketone | 84.7 |
| Pigments | .8 |
| | 100.0 |

This topcoat was prepared by first dissolving the polymethyl methacrylate in methyl ethyl ketone, then adding the polyvinyl chloride/polyelectrolyte powder. At this stage, the polyelectrolyte phase did not dissolve and formed a milky-white mixture. The mixture was stirred until it became homogeneous and then the pigments were added followed by a grinding operation. Dry films cast from these topcoats gave moisture vapor permeability values of 2000 g. to 2300 g. of water vapor per hour per 100 sq. meters of surface for films 3.5 to 4 mils thick when determined at 90% relative humidity and 78° F. Since less than a mil thickness (about 1.0 oz./sq. yd.) of topcoat was applied to the coated structures, the permeability of the total construction was not materially altered by the topcoat.

The coated fabric was embossed in a grain simulating leather by well known procedures.

The coated fabric had the following physical properties:

| | |
|---|---|
| Total weight, per sq. yard | 20.1 oz. |
| Weight of coating, per sq. yard | 9.7 oz. |
| Adhesion of coating to fabric, 1" strip | 11.5 lbs. |
| Abrasion, Wyzenbeek test (240J Emery) | 1500 strokes. |
| Water vapor permeability | 1000–1500 grams/hr./100 sq. meters. |

The coated fabric was useful for sport jackets and had an acceptable comfort value.

The water vapor permeability test was carried out by filling a three inch diameter crystallizing dish with 12 mesh calcium chloride, covering the dish with membrane of the substance to be tested and placing the covered dish in an atmosphere of high humidity (23° C. and 90% relative humidity). The assemblage is weighed at intervals and the equilibrium rate of sorption is recorded as grams of water per 100 square meters of surface per hour. This is a modification of a test developed by the Bureau of Standards, Kanogy & Vickers, J. Res. Nat. Bur. of Stds. 44, 347–62, 1950 (April).

The adhesion test was carried out on a Scott tensile tester by separating the coating manually from the fabric at one end of a 12" strip 2 inches wide, and placing the fabric in one set of jaws and the coating in the opposite set and pulling the jaws apart at a uniform rate. The pounds pull required to separate the coating from the fabric is recorded per 1 inch width of the strip.

The Wyzenbeek abrasion test was carried out in accordance with the procedure described in Method 5304 of Federal Specification CCC–T–191b dated May 15, 1951, and entitled "Textile Test Methods."

As a control test, another plastisol having the identical formula as that given above was prepared in accordance with the following procedure:

The aqueous solution of sodium polyacrylate cross-linked with epichlorohydrin was spray dried. The dried polyelectrolyte was ball milled into a fine powder. The dried polyelectrolyte polymer and polyvinyl chloride, both in the form of dry powder, were dispersed in the plasticizer together with the pigments, stabilizer and volatile hydrocarbon to form a plastisol having the same formula as that described for Example I. The plastisol was spread on a 1.14—54" broken twill in the same manner and in substantially the amount as that described for Example I. The coating was fused in the same manner as that described in Example I. The coated fabric was tested for water vapor permeability in accordance with the procedure outlined above and the coated fabric had substantially zero water vapor permeability.

Example II

In contrast to the control sample for Example I, if the powdered sodium polyacrylate cross-linked with epichlorohydrin is added as a filler to the plastisol prepared in accordance with the procedure of Example I the water vapor permeability of the resulting film is increased. The following plastisol formula illustrates this feature of the invention.

| | Parts by wt. |
|---|---|
| Particulate polyvinyl chloride/sodium polyacrylate cross-linked with epichlorohydrin (80/20) (same as in Example I) | 41.4 |
| Di(2-ethyl hexyl) phthalate | 40.6 |
| Pigment | 5.0 |
| Stabilizer | 1.0 |
| Filler, particulate sodium polyacrylate cross-linked with epichlorohydrin | 10.0 |
| Hydrocarbon diluent (kerosene) (B. R. 175–275° C.) | 2.0 |
| | 100.0 |

The above plastisol was prepared in the same manner as that described for Example I, i. e., the dry particulate materials were dispersed in the liquid materials without dissolving the polymeric film-formers. The plastisol was spread on the 1.14—54" broken twill fabric in a single coat to deposit about 10.5 oz./sq. yd. followed by fusing at about 300–350° F. The topcoat of Example I was applied to the fused coating in the same manner and in the same amount as Example I. The coated fabric was embossed with the same grain as that employed for Example I.

The coated fabric had the following physical properties:

| | |
|---|---|
| Total weight, per sq. yd | 21.7 oz. |
| Weight of coating, per sq. yd | 11.3 oz. |
| Adhesion of coating to fabric, 1" strip | 9.2 lbs. |
| Abrasion, Wyzenbeek test (240J Emery) | 1100 strokes. |
| Water vapor permeability | 2000–2500 grams/hr./100 sq. meters. |

Example III

A water vapor permeable unsupported film was prepared by blending a polyvinyl chloride aqueous latex with an aqueous dispersion of sodium polyacrylate cross-linked with epichlorohydrin in accordance with the following procedure:

| | Parts By Wt. | |
|---|---|---|
| | Wet Basis | Dry Basis |
| Polyvinyl Chloride Aqueous Latex (48.5% Solid Polymer) | 49.2 | 86.3 |
| 7.5% Aqueous Gel of Sodium Polyacrylate Cross-linked with Epichlorohydrin | 50.8 | 13.7 |

The above composition was thoroughly mixed and then tray dried in an oven at 160° F. The dry particulate polymer blend was further comminuted by ball milling, after which it was heated to remove any traces of water that might be adsorbed or absorbed by the polymer.

The dried polymer blend was dispersed in dioctyl phthalate, together with pigment and stabilizer, in accordance with the following formula to form a plastisol:

| | Parts by wt. |
|---|---|
| Particulate polyvinyl chloride/sodium polyacrylate cross-linked with epichlorohydrin | 59.7 |
| Dioctyl phthalate | 32.4 |
| Pigments | 2.1 |
| Stabilizer | 1.0 |
| VM & P naphtha (B. R. 90° C.–160° C.) | 4.8 |
| | 100.0 |

The plastisol was prepared in accordance with the procedure outlined for Example I. The plastisol was spread on a glass plate and placed in an oven at 300° F. for 30 minutes. After film had cooled to room temperature it was stripped from the glass plate and further heated at 400° F. for 1.5 minutes to completely fuse the polymer particles and form a tough, continuous film. The fused film was 5.5 to 6.0 mils thick and had a water vapor permeability of 3140 g./hr./100 sq. meters of surface area.

In addition to doctor knife coating as illustrated by the examples, the compositions of this invention may be shaped by other means such as, e. g., molding, extruding, spraying, roller coating, and dipping forms into the composition, followed by heating to fuse or set the composition in its final shape.

The liquid plasticizers that may be used in preparing the compositions of this invention include the high-boiling compatible materials which are substantially non-solvents for the non-electrolyte polymer at room temperature but are solvents at elevated temperatures. Plasticizers, among others that may be used, include tricresyl phosphate, octyl diphenyl phosphate, di(butoxy ethyl) phthalate, dioctyl phthalate, di(2 ethyl hexyl) phthalate, dicapryl phthalate, dibutyl phthalate, methoxyethyl acetyl ricinoleate, sebacic acid esters such as, e. g., di(butoxy ethyl) sebacate and combinations of any of these plasticizers which is a non-solvent for the polymer at low temperatures but a solvent at elevated temperatures. The proportion of liquid plasticizer that may be used in preparing the plastisol compositions of this invention is dependent to a large degree on the proportion of other agents such as pigment and filler present in the final composition. In general, plastisols may be prepared from mixtures of the polymer blend and plasticizer containing from about 30% to 70% by weight of the plasticizer, based on the combined weight of the polymer blend and plasticizer. When the lower proportions of plasticizer are employed a volatile liquid diluent which is compatible with the plasticizer and a non-solvent for the polymer blend may also be employed. VM and P naphtha, ethyl alcohol and mixtures of aliphatic and aromatic hydrocarbons are satisfactory volatile diluents. The volatile diluents may be present in amount of about 10% or more, based on the weight of the total composition.

The polyelectrolyte polymers suitable for use in the practice of this invention include any polymer containing both acidic (anionic) groups, or salts thereof, and 1,2-epoxy groups, in which the molar ratio of acidic (anionic) groups to epoxy groups is at least 1:1 and in which there are at least 0.2 acidic (anionic) group per 100 molecular weight. These polymers can be prepared in certain cases by copolymerizing unsaturated acidic monomers, e. g., methacrylic acid, with unsaturated epoxy monomers, e. g., glycidyl methacrylate. Such systems cross-link extremely fast. In general, it is more convenient to introduce epoxy groups in a polyanionic polymer, for example, by partially esterifying polybasic polymeric acids, or ester-forming derivatives thereof, with epoxy-alcohols or ester-forming derivatives thereof.

Suitable polybasic polymeric acids include, for example, polyacrylic acid, polymethacrylic acid, polyethacrylic acid, poly-alpha-chloroacrylic acid, and the like; the interpolymers of monocarboxylic acids of the acrylic series with polymerizable vinylidene compounds, for example, the copolymers of methacrylic acid with methyl methacrylate, vinyl acetate, styrene or 1,3-butadiene, or the copolymers of acrylic acid with acrylonitrile; the hydrolyzed copolymers of alpha, beta-ethylenically unsaturated dicarboxylic acid anhydrides such as maleic anhydride with polymerizable vinylidene compounds such as ethylene, propylene, isobutylene, styrene, methylvinyl ether, vinyl acetate, vinyl chloride, ethyl acrylate, and the like; the polysulfonic acids such as polyvinylsulfonic acid, polyvinylbenzenesulfonic acids, polyvinylnaphthalenesulfonic acids; the polymeric acids obtained by reacting phosphoric acid with polyvinyl alcohol or the hydrolyzed ethylene/vinyl acetate copolymers; the naturally occurring polymers containing a plurality of acidic groups, such as lignic acid, alginic acid, carboxymethylcellulose; and the like. These polymeric acids, or their ammonium or alkali metal salts, can be partially esterified with epoxy-alcohols or the corresponding halogen derivatives.

Suitable epoxy-alcohols include, for example, 2,3-epoxy propanol, 5,6-epoxyhexanol-2, beta-hydroxyethyl ethylene oxide, 3,4-epoxy-2,2,4-trimethylpentanol-3, epoxydodecanol, epoxyoctadecanol, 3-hydroxy-1,2-epoxycyclohexane, alpha-hydroxymethyl-alpha-phenylethylene oxide, and the like. In general, the most convenient way of preparing the partial epoxy-alcohol esters of the polymeric acids is to react the sodium salt of the latter with a chloroepoxy compound, e. g., the chloroepoxy compounds corresponding to the hydroxyepoxy compounds listed above. Epichlorohydrin is particularly preferred since it is the most economical material with which epoxy groups can be introduced.

The preferred epoxy-containing polyelectrolyte polymers for use in the practice of this invention are those obtained by partial reaction of epichlorohydrin with the polymers of aliphatic monocarboxylic acids having a methylene ($CH_2=$) group attached by an ethylenic double bond to a carbon atom alpha to the carboxylic acid group; and in particular the polymers of acrylic and alphamethacrylic acid.

Examples of suitable water-insoluble non-electrolyte film-forming polymers and copolymers of vinyl halides such as, e. g., vinyl fluoride, chloride, bromide and iodide; vinylidene halides such as, e. g., 1,1-dichloroethylene; 1,2-dichloroethylene, 1,1-dichloro-2,2-difluoroethylene, trifluorochloroethylene; vinyl carboxylates such as vinyl formate, vinyl acetate, vinyl chloroacetate, vinyl butyrate, vinyl laurate; and vinyl acetals such as formal, acetal and butyral. It will be obvious that compatible mixtures of these non-electrolyte vinyl polymers and copolymers may be used in practicing this invention.

It is to be understood that any of the aforementioned polyelectrolyte polymers and non-electrolyte polymers may be substituted in the examples in like amount.

In some instances, additional desirable properties are imparted to the polymer blends by treating the aqueous dispersions of the polymer blend before spray drying with salts of polyvalent cations or of polyvalent anions, such as barium chloride, calcium chloride, magnesium chloride, tin tetrachloride, aluminum chloride, cadmium acetate, lead nitrate, mercuric chloride, zinc chloride, nickel diacetate, aluminum potassium sulfate, basic chromium sulfate, sodium silicate, sodium cobaltinitrite, sodium chloroplatinate and the like. Such a treatment gives stiffer products and serves to vary the texture of the films, e. g., to give them a rougher feel.

The fused plastisol compositions of this invention are particularly useful in the form of self-supporting film suitable for packaging, which can be prepared by extrusion or spreading the plastisol on a temporary support, heating to fuse the plastisol and finally stripping the plastisol from the temporary support. The stability, hydrophilic nature and high degree of moisture permeability of the fused plastisols make them highly useful as substitutes for leather and in many other fields such as hydrophilic fibers, which can be made, for example, by extruding a suitable plastisol through a spinneret, with subsequent heating to fuse the polymer blend.

Fabrics coated or impregnated with these polymer blends show excellent anti-static properties. The polymer blends are particularly useful as impregnants for non-woven webs of natural or synthetic fibers. The resulting fabrics have a leather-like texture; they are impermeable to liquid water but highly permeable to water vapor.

These polymer blends, after cross-linking, can also be used as ion-exchange membranes, leather finishes, food wrappings, semi-conducting sheetings, electrical potting compounds, fuel-resistant gaskets or diaphragms, and the like. The blends can also be shaped in the form of monofils or of fine fibers, which can be used to make fabrics or non-woven webs.

As many apparently widely different embodiments of this invention may be made without departing from the spirit and scope thereof, it is to be understood that this invention is not limited to the specific embodiments thereof except as defined in the appended claims.

I claim:

1. A plastisol composition which forms a water vapor permeable film comprising a particulate polymer blend comprising (a) a water-insoluble, water-dispersible, non-electrolyte film-forming polymer of at least one polymerizable ethylenically unsaturated monomer and (b) the reaction product of a water-soluble polyelectrolyte polymer and a compound containing 1,2-epoxy groups, said reaction product containing 1,2-epoxy groups, said polyelectrolyte polymer containing at least 0.2 acidic groups per 100 molecular weight, said acidic groups selected from the class consisting of carboxyl, sulfonic, and phosphoric acid groups and their alkali metal and ammonia salts, the molar ratio of acidic groups to 1,2-epoxy groups of the reactants being at least 1:1, said polymers (a) and (b) having been dispersed in a common aqueous medium and separated from the aqueous medium simultaneously to form a dry particulate polymer blend, said particulate polymer blend being dispersed in an organic liquid plasticizer which is a non-solvent for polymer (a) at room temperature and a solvent at elevated temperatures.

2. The product of claim 1 in which the weight ratio of polymer (a) to reaction product (b) is within the range of 50:50 to 97:3.

3. The product of claim 1 in which the weight ratio of said polymer blend to said plasticizer is within the range of 30:70 and 70:30.

4. The composition of claim 1 in which the non-electrolyte polymer is a vinyl chloride polymer.

5. The composition of claim 1 in which the polyelectrolyte polymer is sodium polyacrylate cross-linked with epichlorohydrin.

6. The composition of claim 1 in which the plasticizer is dioctyl phthalate.

7. The composition of claim 1 in which the non-electrolyte polymer is a vinyl chloride polymer, the polyelectrolyte polymer is sodium polyacrylate cross-linked with epichlorohydrin and the plasticizer is dioctyl phthalate.

8. A fabric coated with a fused plastisol composition of claim 1.

9. A woven fabric coated with a fused plastisol composition of claim 1.

10. A non-woven fabric comprising a fused plastisol composition of claim 1.

11. A process of preparing a plastisol composition which forms a water vapor permeable film which comprises dissolving in an aqueous medium a water-soluble, anionic polyelectrolyte polymer containing ionizable groups, said ionizable groups consisting of carboxyl, sulfonic and phosphoric acid groups, and their alkali-metal and ammonia salts, reacting said anionic polyelectrolyte polymer in aqueous solution with a compound containing 1,2-epoxy groups thus forming a gel, said reaction product containing 1,2-epoxy groups, said polyelectrolyte polymer containing at least 0.2 acidic groups per 100 molecular weight, the molar ratio of acidic groups to 1,2-epoxy groups of the reactants being at least 1:1, separately preparing an aqueous suspension of at least one water-insoluble non-electrolyte film forming polymer of at least one polymerizable ethylenically unsaturated monomer, blending said aqueous gel with said aqueous dispersion, simultaneously separating the polyelectrolyte polymer and the non-electrolyte polymer from the water to produce a dry particulate polymer blend and dispersing said dry particulate polymer blend in an organic liquid plasticizer which is a non-solvent for said non-electrolyte polymer at room temperature and a solvent at elevated temperatures to form a plastisol.

12. The process of claim 11 in which the weight ratio of non-electrolyte polymer to the reaction product of the polyelectrolyte polymer and 1,2-epoxy containing compound is within the range of 50:50 and 97:3.

13. The process of claim 11 in which the weight ratio of said polymer blend is within the range of 30:70 and 70:30.

14. The process of preparing water vapor permeable coated fabric which comprises applying the plastisol composition of claim 11 to a fabric substrate, and heating said treated fabric to fuse the particulate polymer blend in the plasticizer to form a tough, continuous, water-vapor permeable coating.

15. The process of claim 14 in which the fabric substrate is a woven fabric.

16. The process of claim 14 in which the fabric substrate is a non-woven fabric.

References Cited in the file of this patent

UNITED STATES PATENTS 2,607,754     Ellingboe et al.          Aug. 19, 1952

OTHER REFERENCES

Schildknecht, Vinyl and Related Polymers, Wiley and Sons, New York, 1952, page 299.